(12) United States Patent
Langhammer (10) Patent No.: US 8,649,518 B1
(45) Date of Patent: Feb. 11, 2014

(54) IMPLEMENTING CSA CRYPTOGRAPHY IN AN INTEGRATED CIRCUIT DEVICE

(75) Inventor: Martin Langhammer, Alderbury (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/369,821

(22) Filed: Feb. 9, 2012

(51) Int. Cl.
*H04K 1/00* (2006.01)
*H04L 29/06* (2006.01)

(52) U.S. Cl.
CPC .................................. *H04L 63/0428* (2013.01)
USPC ....................................................... 380/255

(58) Field of Classification Search
USPC ....................................................... 380/255
See application file for complete search history.

(56) References Cited

U.S. PATENT DOCUMENTS

| | | | |
|---|---|---|---|
| 5,228,031 A * | 7/1993 | Mertelmeier et al. | 370/422 |
| 5,488,659 A * | 1/1996 | Miliani | 380/212 |
| 7,620,179 B2 * | 11/2009 | Fahrny et al. | 380/210 |
| 2004/0032950 A1 * | 2/2004 | Graunke | 380/42 |
| 2007/0271449 A1 * | 11/2007 | Lichtensteiger et al. | 712/244 |

* cited by examiner

*Primary Examiner* — Peter Shaw
(74) *Attorney, Agent, or Firm* — Ropes & Gray LLP; Jeffrey H. Ingerman (57) ABSTRACT

A method and circuitry for implementing CSA fast enough for use in programmable devices such as FPGAs process multiple packets with the words that were contained within the packets out of order, and then combines processed words in the correct order. Data advance and data delay techniques can be used to combine processed words correctly. The invention can be used for encryption, decryption, or both. Respective words from each data packet in a plurality of data packets are processed substantially simultaneously. Those respective words are processed in a first cipher path to generate intermediate blocks, and the intermediate blocks are processed in a second cipher path. Timing of the intermediate blocks after output from the first cipher path can be adjusted if necessary.

22 Claims, 5 Drawing Sheets

IMPLEMENTING CSA CRYPTOGRAPHY IN AN INTEGRATED CIRCUIT DEVICE

FIELD OF THE INVENTION

This invention relates to implementation of the Common Scrambling Algorithm in integrated circuit devices, and particularly in programmable integrated circuit devices such programmable logic devices (PLDs).

BACKGROUND OF THE INVENTION

The Common Scrambling Algorithm (CSA) is used to encrypt digital video broadcasts, primarily to prevent unauthorized (i.e., unpaid) viewing of subscription video content.

CSA may be implemented in either hardware or software. Either way, it is desirable that encryption and decryption occur fast enough to provide an uninterrupted viewing experience to maintain subscriber satisfaction. This is not difficult with appropriate software on a suitable processor, nor on dedicated hardware. However, when implemented in a programmable integrated circuit device, and particularly in a programmable logic device such as an FPGA, it has been observed that the hardware may be too slow for uninterrupted viewing unless a large number of parallel devices is provided.

SUMMARY OF THE INVENTION

The present invention relates to method and circuitry for implementing CSA fast enough for use in programmable devices such as FPGAs, although the circuitry can be implemented as dedicated circuitry as well. Embodiments of the invention process multiple packets with the words that were contained within the packets out of order, and then combines processed words in the correct order. Data advance and data delay techniques can be used to combine processed words correctly. The invention can be used for encryption, decryption, or both.

In accordance with embodiments of the invention, there is provided a method of performing one of decryption or encryption on data packets, where each of the data packets includes words. The method includes processing a plurality of those data packets, where respective words from each data packet in the plurality of data packets are processed substantially simultaneously. Those respective words are processed in a first cipher path to generate intermediate blocks, and the intermediate blocks are processed in a second cipher path. Circuitry for performing the method also is provided.

A method of configuring a programmable device as such circuitry is also provided, and a non-transitory machine-readable data storage medium is provided that is encoded with software for performing the method of configuring such circuitry on a programmable device.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

CSA operates on a packet and word basis. Each packet can be as long as 188 bytes, divided into "words" or "blocks" of 8 bytes (64 bits). Each packet therefore can include up to 23 words (plus four overhead bytes). In conventional CSA, one word or block is processed at a time.

CSA includes both a "stream cipher" and a "block cipher." Each block or packet has an associated key. The key may be different for every packet or multiple packets may share a key. In decryption mode, the stream cipher is performed first on the encrypted source blocks and generates, from each source block, an "intermediate block" that is processed by the block cipher to yield decrypted cleartext blocks. Each intermediate block may be processed as it is generated, without waiting for any other blocks to be processed. In encryption mode, the block cipher operates first on the cleartext source blocks to yield intermediate blocks, and then the stream cipher operates on the intermediate blocks to yield encrypted blocks. However, the order of operation may be different; the stream cipher may not operate on the intermediate blocks until all of the blocks in the packet have been operated on by the block cipher.

Figure 1:
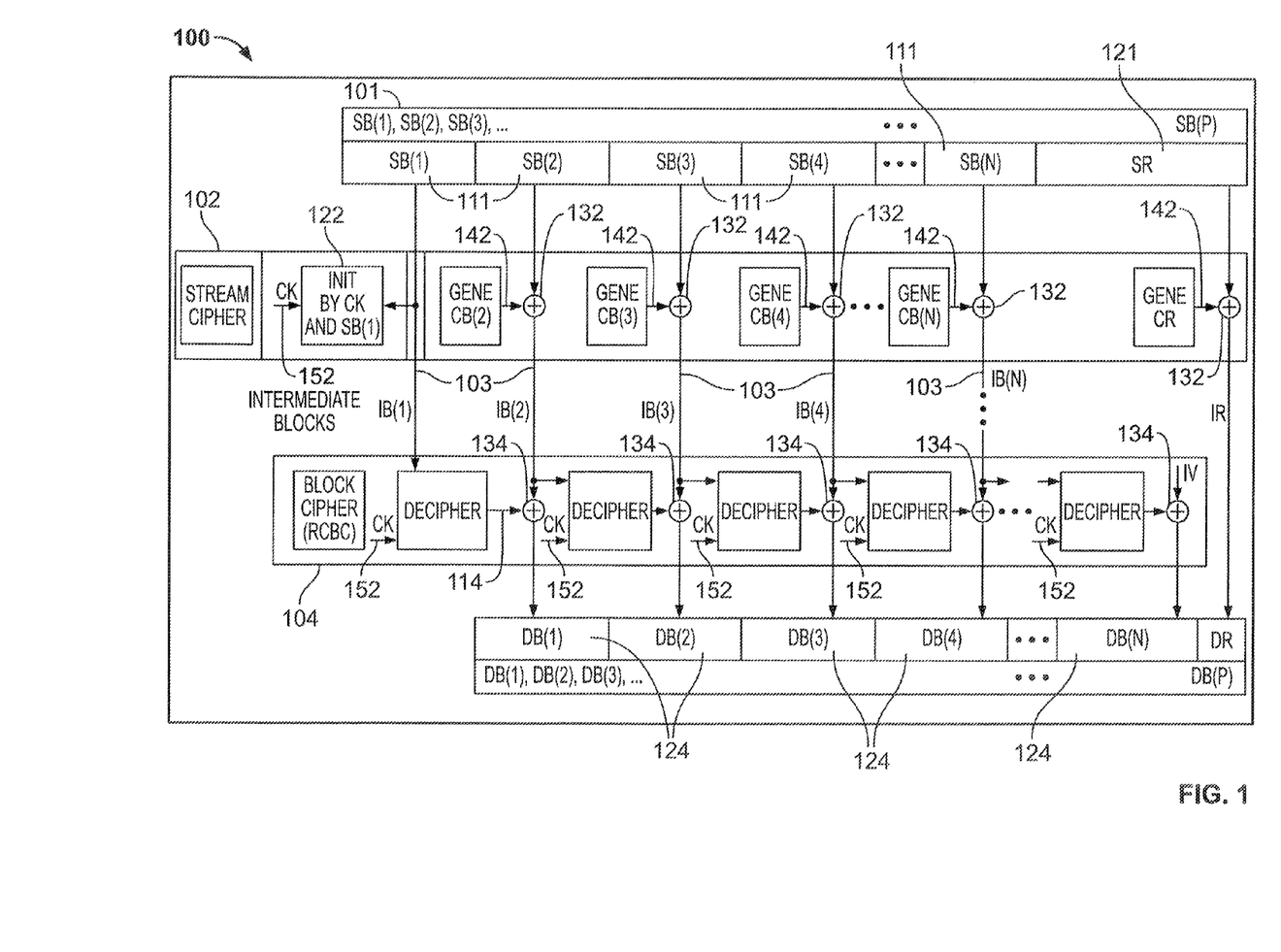
FIG. 1 shows the data flow for CSA decryption.

A known CSA architecture 100 is shown in FIG. 1, in "unrolled" form—i.e., architecture 100 is shown as a series of hardware elements, but in fact may be performed repeatedly by a small number of elements (or even one element). A stream 101 of n input source blocks SB(n) 111 is shown, plus, where the packet does not contain an integer multiple of eight bytes, a scrambled residue ("SR") block 121 containing fewer than eight bytes. Stream cipher 102 is initialized at 122 using the cipher key ("CK") 152 for the current packet, to derive a "stream state". Each source block or word is XORed (i.e., combined in an exclusive-OR operation) at 132 with output of the operation at 142 of stream cipher 102 on the previous stream state (as stored in internal registers) to generate an intermediate block (at 103) as well as the next stream state. This combination with the previous result makes each step dependent on all previous steps, thereby enhancing the security of the decryption (one has to have decrypted the previous blocks correctly to decrypt the current block correctly).

In the first instance of the block cipher 104, the first intermediate block 103 is deciphered using the cipher key 152 for the current block, providing a ciphertext word 114. In each subsequent instance of block cipher 104, the previous ciphertext word 114 is XORed at 134 with the current intermediate block 103 to provide an output decrypted block (DB(n)) at 124. Each intermediate block 103 also is deciphered by the block cipher 104 using the cipher key 152 for the current block to provide the next ciphertext word 114.

Each instance 132 of an embodiment of the stream cipher, as well as the initialization 122, can be performed in 32 operations. As suggested above, the 32 operations may be performed iteratively with a single hardware unit—e.g., using one clock cycle for each operation. As one alternative, the operations can be unrolled, and the operations performed in a single combinatorial operation. As a further alternative, the operations can be unrolled into a stack of pipelined iterations, with fewer than all, but more than one, operation being performed at each pipeline stage. If the operations are pipelined, multiple instances can be active in the pipeline at any one time. The result of each instance may include two outputs, including the stream state (which may, e.g., be 107 bits long) and an output word—i.e., an intermediate block 103 (which may, e.g., be 64 bits long).

Similarly, in one embodiment, each instance of block cipher 104 can be performed in 56 operations. As with stream cipher 102, the 56 operations may be performed iteratively with a single hardware unit—e.g., using one clock cycle for each operation, or they can be unrolled completely or partially and pipelined to some degree.

In such an embodiment, a simple way of implementing stream cipher 102 and block cipher 104 in descrambling hardware is to calculate an instance of the stream cipher in 32 clocks, followed by an instance of the block cipher in 56 clocks, and then to perform the XORing of various words to generate the next block cipher inputs and the current descrambling output. Because the individual steps are relatively simple, multiple steps can be unrolled and performed in a single clock cycle. For example, rather than 32 and 56 clocks, stream cipher 102 and block cipher 104 could be computed in 4 and 7 clocks each, respectively, in eight pipeline stages, or 8 and 14 clocks each, respectively, in four pipeline stages. Other combinations may be possible. However, this still requires multiple clock cycles for each instance.

Figure 2:
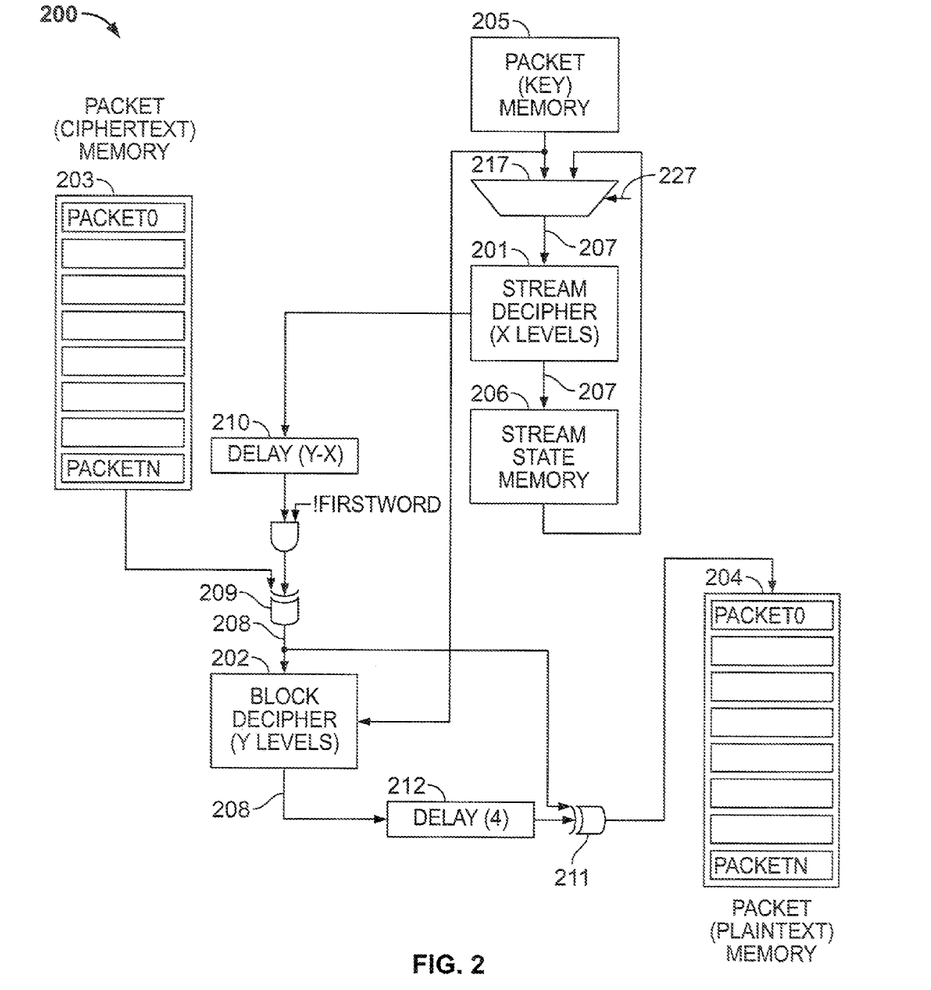
FIG. 2 shows an example of decryption circuitry according to an embodiment of the invention.

In accordance with embodiments of the present invention, in a pipelined implementation multiple packets can be processed at once. An entire word from each packet can be processed in a single clock cycle. The pipeline will be filled with multiple words from different packets in different stages of processing, and on each clock cycle a different word will be output. An example of an architecture 200 in accordance with such embodiments is shown in FIG. 2. In one example, architecture 200 may process 16 packets simultaneously, which could, e.g., represent separate video streams for 16 subscribers.

In architecture 200, both stream cipher unit 201 and block cipher unit 202 may implement a partially unrolled implementation of each respective cipher. The particular level of pipelining is not important, as architecture 200 can be easily modified to support different levels of pipelining in stream cipher unit 201 and block cipher unit 202. The level of pipelining can also differ as between the two cipher units 201, 202. Because of the difference in logic complexity at each step in the respective ciphers, block cipher unit 202 normally would be more deeply pipelined than stream cipher unit 201. For example, if implemented in a typical FPGA where a look-up table/register programmable logic structure is used, stream cipher unit 201 may be pipelined between 8 and 16 levels and block cipher unit 202 may be pipelined between 16 and 32 levels.

As noted above, architecture 200 may operate on a number of packets simultaneously. The number of simultaneous packets may advantageously be approximately the same as the level of pipelining in block cipher unit 202, but may be more or less. As an example, the stream cipher pipeline depth may be 8 while the block cipher pipeline depth is 16. In some cases, fewer packets than the number for which architecture 200 is designed will be loaded. Architecture 200 will still decrypt them normally, but at a lower system throughput than at the optimal level.

Architecture 200 includes a ciphertext (input) memory 203, a plaintext (output) memory 204 and a packet key memory 205. Memories 203, 204, 205 may be double-buffered, so that half of each memory can be loaded and unloaded while the other half of each memory is processed by one or both of cipher units 201, 202. There is also a stream state memory 206 which need not be double-buffered.

It is possible that there will be only one key for all packets, in which case packet key memory 205 may be a single word-wide register. More likely, particularly when video streams are being processed for different subscribers, there will be a different key for each packet (or at least for each subscriber's stream of packets). Either way, the key or keys may be loaded first. If there is more than one key, each key can be loaded along with a packet number identifying the packet or stream of packets to which it applies, or the order in which the keys are loaded may correlate to the packets.

The packets may then be loaded, word by word. The packets and words may be individually addressed, or sequentially loaded with a strobe signal. Because some packets may be shorter than the maximum 188 bytes, an input signal can be used to indicate the last word in a packet. This indication can be stored alongside the word data so that the controller can process the last word correctly.

The packets can be stored contiguously—i.e., the first word of a packet immediately follows, in memory, the last word of the previous packet—or on fixed boundaries—i.e., a certain number of word slots is allocated for each packet regardless of the number of words in a particular packet. For example, in the case where each packet has a maximum length of 188 bytes in 8-bit words, having a maximum of 23 (i.e., $\sim 2^{4.52}$) words per packet, the words can be stored consecutively and contiguously. But if, alternatively, the packets are stored on 32-word boundaries (i.e., $2^5$ words) even if the maximum number of words is not present, then the addressing logic in the controller is simplified, although more memory may be consumed by empty slots.

If the keys and packets are individually addressed (i.e., packet and/or word numbers are associated with each input word), then the loading can be performed in any order and does not have to be sequential. On the other hand, loading can be performed sequentially to avoid individual addressing.

Processing can start automatically when a certain number of packets have been loaded, or processing can be manually started.

The stream cipher pipeline depth and the block cipher pipeline depth are referred to generically in FIG. 2 as X and Y, respectively. Taking an example in which the stream cipher pipeline depth is 8 and the block cipher pipeline depth is 16, the first operation at the start of the processing would be to generate an initialized state data set for the stream cipher (i.e., to initialize the stream state as discussed above). This may be accomplished by setting an input operation bit of the stream cipher to a value signifying initialization, and then entering each key into packet key memory 205 at the top of the stream pipeline. For example, this may be done one key per clock cycle. After 8 clock cycles (the pipeline depth of the example stream cipher), a state vector will be output from the stream decipher pipeline 207. The same address order of the key memory 205 will be used to write the state vector data (including one state for each active stream) into the stream state memory 206. The stream states can be accessed by their addresses, or stream state memory 206 may be arranged as a FIFO.

After the last key has been entered into stream decipher pipeline 207 for initialization, the first state vector can be re-entered into stream decipher pipeline 207 via multiplexer 217. The aforementioned input operation bit is now set to a value signifying stream processing (instead of initialization). The input operation bit can also control, at 227, the selection made by multiplexer 217. It does not matter that there are still initialization data in stream decipher pipeline 207, because input operation bit 27 will not affect a pipeline stage until it has propagated through the pipeline to that stage. The initialization data will be written to the stream state memory 206 upon output from the pipeline 207. The state vector address remains in step with the key address.

At the same time that the key is input into stream decipher pipeline 207, it is also put into the block decipher pipeline 208. The key is continuously cycled through both the stream and block decipher pipelines 207, 208 (and therefore so is the stream vector through the stream decipher pipeline 207 only).

The ciphertext words are output from the packet ciphertext memory 203 and input into the block cipher continuously as well. However, the words from different packets are interleaved so that all of the first ciphertext words of all of the packets are input in the first 16 cycles (in this example), followed by the second ciphertext words of all of the packets in the next 16 cycles (in this example), followed by the third ciphertext words, and so on. After 23 sets (in this example) of 16 cycles (in this example), all of the ciphertext words in all of the packets will have been input into the block decipher pipeline 208, and each ciphertext word will have been matched to its respective key. However, the first data are not entered into block decipher pipeline 208 until the second stream decipher cycle starts (the first stream decipher cycle is only for initialization of the 16 stream states).

The output of each stream decipher cycle is XORed at 209 with the corresponding set of ciphertext words before input to block decipher pipeline 208, and therefore needs to be delayed until the corresponding set of ciphertext words can start being input into the block cipher, which is not until the previous set of ciphertext words has finished being input into block decipher pipeline 208. The pipeline delay through stream decipher pipeline 207 is shorter than the delay through block decipher pipeline 208, so the difference in pipeline delay can be corrected by a delay line 210 between stream decipher pipeline 207 and block decipher pipeline 208. This delay is approximately equal to the difference between the block pipeline depth (Y) and the stream pipeline depth (X).

The input to block decipher pipeline 208 (i.e., the XOR of the stream decipher output word with the ciphertext word) is XORed with the output of the block decipher pipeline at 211 to generate the plaintext output. Depending on the pipeline depth of block decipher pipeline 208 compared to the number of simultaneous packets, the XOR 209 of the stream decipher output word with the ciphertext word may need to be delayed by an additional delay circuit (not shown) or advanced (by a delay circuit 212 on the output of block decipher pipeline 208) in relation to the output of block decipher pipeline 208. XOR 209 of the stream decipher output word with the ciphertext word is timed to coincide with the input of data into block cipher pipeline 208, and any delay is added to the output of block cipher pipeline 208, and not vice versa. This delay can also be affected by any delay in setting up the next stream or block decipher operation. In the example given there is an advance 212 (of 4 clock cycles) instead of a delay.

The plaintext blocks are written into plaintext memory 204, which may have a memory structure similar to that of ciphertext memory 203. Plaintext memory 204 therefore can be addressed for unloading in the same way that ciphertext memory 204 is addressed for loading—i.e., by specifying an individual packet or word, or by sequentially unloading each word using a control signal or strobe.

Figure 3:
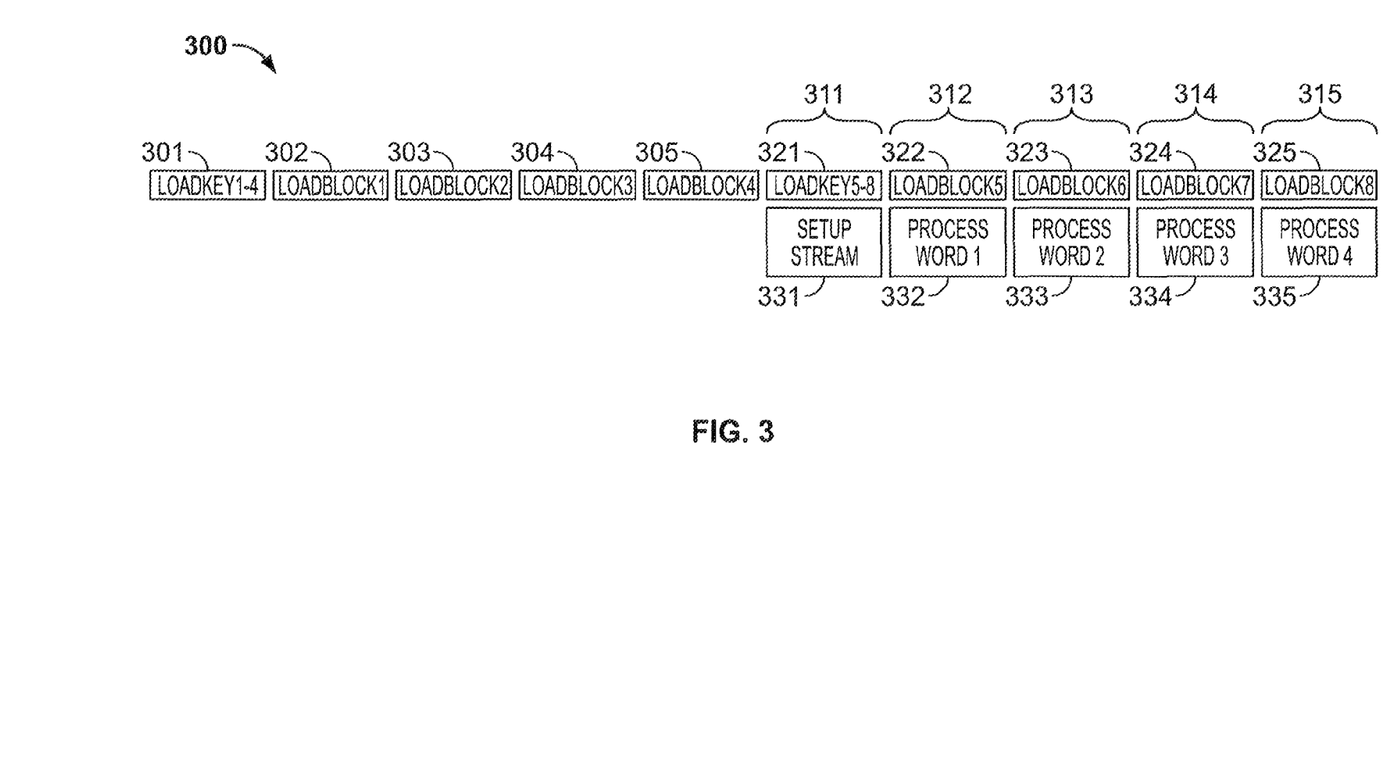
FIG. 3 shows an example of a load sequence according to an embodiment of the invention.

Once the first set of data has been loaded (approximately Y packets), processing can start, but the next set of data can already begin loading. Therefore, data can be loaded almost continuously. This is illustrated in FIG. 3, which shows an example data load sequence 300. In a first time slot 301, keys for the four blocks (i.e., packets) to be loaded in the next four slots 302-305 are loaded. In the next five time slots 311-315, another set of keys and blocks are loaded at 321-325, while in those same five time slots 311-315, stream setup is performed at 331, followed by simultaneous processing at 332 of all first words of the four blocks loaded at 302-305, then simultaneous processing at 333 of all second words of the four blocks loaded at 302-305, then simultaneous processing at 334 of all third words of the four blocks loaded at 302-305, then simultaneous processing at 335 of all fourth words of the four blocks loaded at 302-305. In the following five time slots (not shown), the keys and blocks loaded at 311-315 are processed, while still further keys and blocks are loaded, although the stream setup at 331 is not repeated so no processing occurs during key loading. Also, new keys may not be loaded for every data set. In such a case, each subsequent data set can be loaded and processed in four slots, because the fifth slot is not need for either key loading or stream setup.

The total time to perform all processing steps is the product of the number of pipeline stages per operation and the number of words per packet. For maximum efficiency the number of packets processed simultaneously should be equal to (or greater than) the number of pipeline stages per operation. If the number of packets processed per unit time is less than the number of pipeline stages per operation, then the time taken to perform the processing steps will still be the same, but the efficiency drops. For example if the pipeline depth is 10 and ten packets are processed per unit time, efficiency is 100%, but if only two packets are processed per unit time in the same pipeline, then efficiency is only 20%.

The speed advantage of the present invention is most useful in descrambling, as described above, for seamless viewing by subscribers. However, the reordering of words in packets also may be used to increase the speed of scrambling operations.

Thus it is seen that circuitry and methods for performing CSA cryptography efficiently have been provided. This invention may have use in both hard-wired implementations and programmable devices.

In programmable devices such as PLDs, as discussed above, programming software can be provided to allow users to configure a programmable device to perform CSA cryptography, either as an end result or as part of a larger operation. The result would be that fewer logic resources of the programmable device would be consumed.

Instructions for carrying out a method according to this invention for programming a programmable device to perform CSA cryptography, may be encoded on a machine-readable medium, to be executed by a suitable computer or similar device to implement the method of the invention for programming or configuring PLDs or other programmable devices to perform operations as described above. For example, a personal computer may be equipped with an interface to which a PLD can be connected, and the personal computer can be used by a user to program the PLD using a suitable software tool, such as the QUARTUS® II software available from Altera Corporation, of San Jose, Calif.

Figure 4:
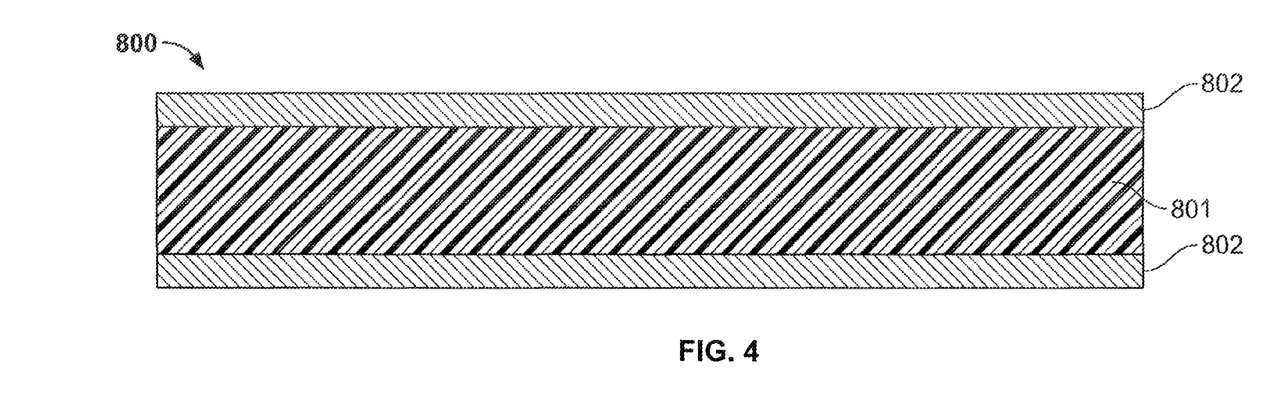
FIG. 4 is a cross-sectional view of a magnetic data storage medium encoded with a set of machine-executable instructions for performing a method according to the present invention.

FIG. 4 presents a cross section of a magnetic data storage medium 800 which can be encoded with a machine executable program that can be carried out by systems such as the aforementioned personal computer, or other computer or similar device. Medium 800 can be a floppy diskette or hard disk, or magnetic tape, having a suitable substrate 801, which may be conventional, and a suitable coating 802, which may be conventional, on one or both sides, containing magnetic domains (not visible) whose polarity or orientation can be altered magnetically. Except in the case where it is magnetic tape, medium 800 may also have an opening (not shown) for receiving the spindle of a disk drive or other data storage device.

The magnetic domains of coating 802 of medium 800 are polarized or oriented so as to encode, in manner which may be conventional, a machine-executable program, for execution by a programming system such as a personal computer or other computer or similar system, having a socket or peripheral attachment into which the PLD to be programmed may be inserted, to configure appropriate portions of the PLD, including its specialized processing blocks, if any, in accordance with the invention.

Figure 5:
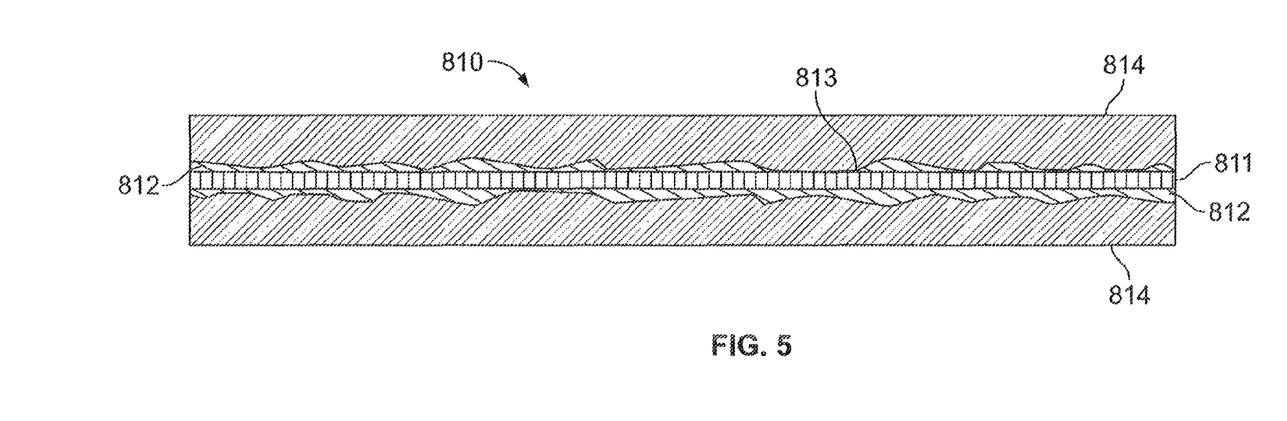
FIG. 5 is a cross-sectional view of an optically readable data storage medium encoded with a set of machine executable instructions for performing a method according to the present invention.

FIG. 5 shows a cross section of an optically-readable data storage medium 810 which also can be encoded with such a machine-executable program, which can be carried out by systems such as the aforementioned personal computer, or other computer or similar device. Medium 810 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 810 preferably has a suitable substrate 811, which may be conventional, and a suitable coating 812, which may be conventional, usually on one or both sides of substrate 811.

In the case of a CD-based or DVD-based medium, as is well known, coating 812 is reflective and is impressed with a plurality of pits 813, arranged on one or more layers, to encode the machine-executable program. The arrangement of pits is read by reflecting laser light off the surface of coating 812. A protective coating 814, which preferably is substantially transparent, is provided on top of coating 812.

In the case of magneto-optical disk, as is well known, coating 812 has no pits 813, but has a plurality of magnetic domains whose polarity or orientation can be changed magnetically when heated above a certain temperature, as by a laser (not shown). The orientation of the domains can be read by measuring the polarization of laser light reflected from coating 812. The arrangement of the domains encodes the program as described above.

A PLD 90 programmed according to the present invention may be used in many kinds of electronic devices. One possible use is in a data processing system 900 shown in FIG. 6. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

Figure 6:
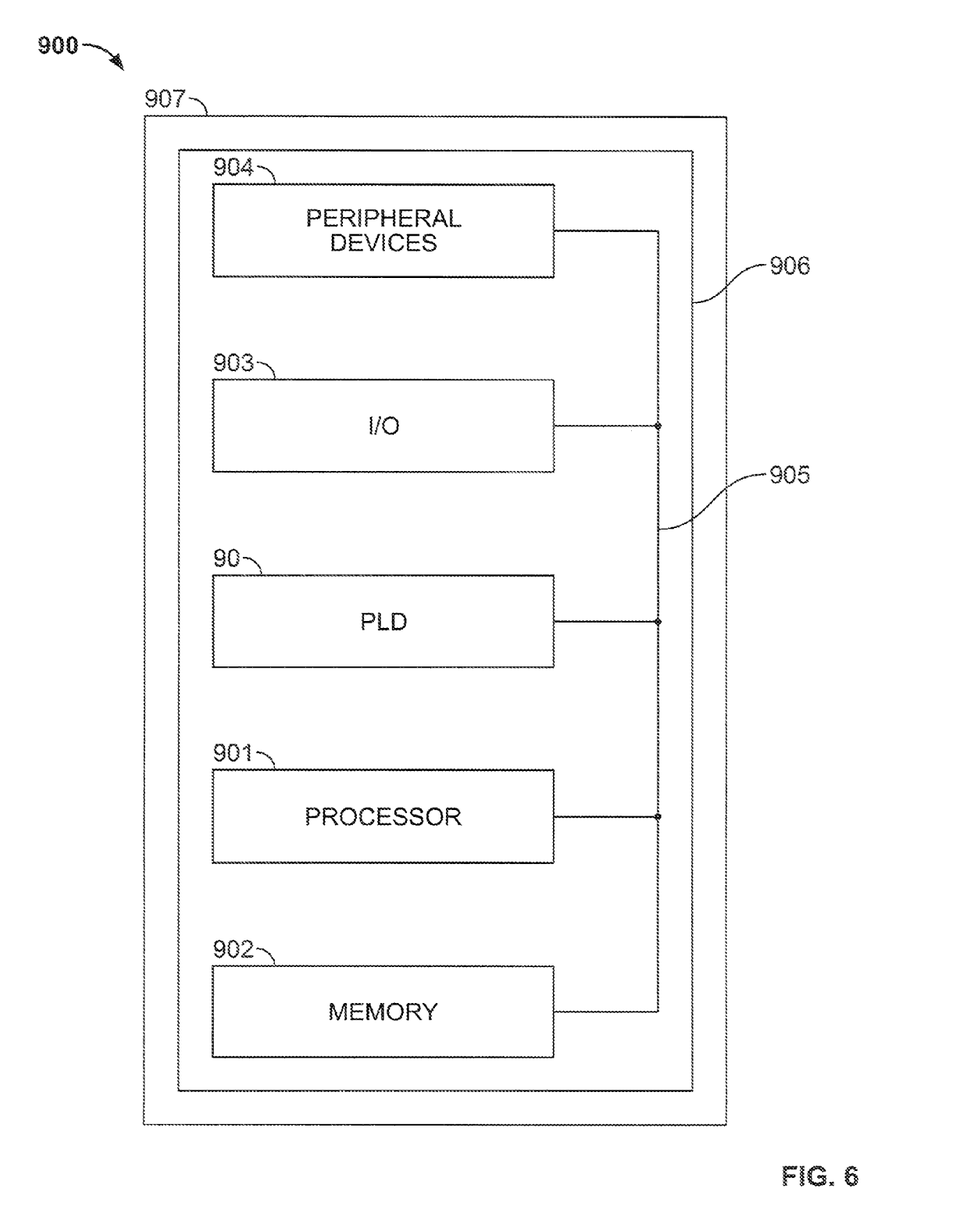
FIG. 6 is a simplified block diagram of an illustrative system employing a programmable logic device incorporating the present invention.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A method of performing one of decryption or encryption on data packets, each of said data packets being divided into words, said words having ordinal positions in said data packets, said method comprising:
   processing a plurality of said data packets, wherein:
   a word having a particular ordinal position in one data packet in said plurality of data packets is processed simultaneously with words having said particular ordinal position in other data packets in said plurality of data packets; and
   said words are processed in first cipher path circuitry that implements a first portion of said one of decryption or encryption to generate intermediate blocks, and said intermediate blocks are processed in second cipher path circuitry that implements a second portion of said one of decryption or encryption; said method further comprising:
   adjusting timing of said intermediate blocks after output from said first cipher path circuitry.

2. The method of claim 1 wherein said one of decryption or encryption is decryption.

3. The method of claim 2 wherein:
   said first cipher path circuitry implements a first cipher that is pipelined to a first pipeline depth; and
   said second cipher path circuitry implements a second cipher that is pipelined to a second pipeline depth.

4. The method of claim 3 wherein said adjusting timing comprises delaying or advancing said intermediate blocks according to a relationship between said first pipeline depth and said second pipeline depth.

5. The method of claim 4 wherein said delaying or advancing comprises delaying said intermediate blocks between said output from said first cipher path circuitry and said input of said second cipher path circuitry.

6. The method of claim 4 wherein said advancing comprises delaying output of said second cipher path circuitry.

7. The method of claim 3 further comprising combining output of said second cipher path circuitry with said output from said first cipher path circuitry using an exclusive-OR operation.

8. The method of claim 7 wherein:
   said adjusting timing comprises delaying said intermediate blocks between said output from said first cipher path circuitry and said input of said second cipher path circuitry; and
   said combining comprises combining said output of said second cipher path circuitry with said delayed intermediate blocks.

9. The method of claim 2 wherein:
a first cipher implemented in said first cipher path circuitry generates a respective stream state along with each of said intermediate blocks; and
processing in said first cipher path circuitry comprises combining each of said words with a respective one of said stream states using an exclusive-OR operation.

10. The method of claim 9 further comprising:
storing said respective stream states; and
inputting each respective stream state to said first cipher path circuitry along with said words.

11. Circuitry for performing one of decryption or encryption on data packets, each one of said data packets being divided into words, each of said words having an ordinal position in said one of said data packets, said circuitry comprising:
first cipher path circuitry that processes a word having a particular ordinal position in one data packet in a plurality of data packets simultaneously with words having said particular ordinal position in other data packets in said plurality of data packets, implementing a first portion of said one of decryption or encryption to generate intermediate blocks;
circuitry that adjusts timing of said intermediate blocks after output from said first cipher path circuitry; and
second cipher path circuitry that processes said intermediate blocks to implement a second portion of said one of decryption or encryption.

12. The circuitry of claim 11 wherein said one of decryption or encryption is decryption.

13. The circuitry of claim 12 wherein:
said first cipher path circuitry implements a first cipher that is pipelined to a first pipeline depth; and
said second cipher path circuitry implements a second cipher that is pipelined to a second pipeline depth.

14. The circuitry of claim 13 wherein said circuitry that adjusts timing comprises circuitry that delays or advances said intermediate blocks according to a relationship between said first pipeline depth and said second pipeline depth.

15. The circuitry of claim 14 wherein said circuitry that delays or advances delays said intermediate blocks between said output from said first cipher path circuitry and said input of said second cipher path circuitry.

16. The circuitry of claim 14 wherein said circuitry that delays or advances said intermediate blocks by delaying output of said second cipher path circuitry.

17. The circuitry of claim 13 further comprising circuitry that combines output of said second cipher path circuitry with said output from said first cipher path circuitry.

18. The circuitry of claim 17 wherein:
said circuitry that adjust timing comprises circuitry that delays said intermediate blocks between said output from said first cipher path circuitry and said input of said second cipher path circuitry; and
said circuitry that combines includes an exclusive-OR gate and combines said output of said second cipher path circuitry with said delayed intermediate blocks.

19. The circuitry of claim 12 wherein:
first cipher circuitry in said first cipher path circuitry generates a respective stream state along with each of said intermediate blocks; and
said first cipher path circuitry comprises circuitry, including an exclusive-OR gate, that combines each of said words with a respective one of said stream states.

20. The circuitry of claim 19 further comprising:
memory that stores said respective stream states; and
circuitry for inputting each respective stream state to said first cipher path circuitry along with said words.

21. A method of configuring a programmable device as circuitry for performing one of decryption or encryption on data packets, each one of said data packets being divided into words, each of said words having an ordinal position in said one of said data packets, said method comprising:
configuring logic of said programmable device as first cipher path circuitry that processes a word having a particular ordinal position in one data packet in a plurality of data packets simultaneously with words having said particular ordinal position in other data packets in said plurality of data packets, implementing a first portion of said one of decryption or encryption to generate intermediate blocks;
configuring logic of said programmable device as circuitry that adjusts timing of said intermediate blocks after output from said first cipher path circuitry; and
configuring logic of said programmable device as second cipher path circuitry that processes said intermediate blocks to implement a second portion of said one of decryption or encryption.

22. A non-transitory machine-readable data storage medium encoded with non-transitory machine-executable instructions for configuring a programmable device as circuitry for performing one of decryption or encryption on data packets, each one of said data packets being divided into words, each of said words having an ordinal position in said one of said data packets, said instructions comprising:
instructions to configure logic of said programmable device as first cipher path circuitry that processes a word having a particular ordinal position in one data packet in a plurality of data packets simultaneously with words having said particular ordinal position in other data packets in said plurality of data packets, implementing a first portion of said one of decryption or encryption to generate intermediate blocks;
instructions to configure logic of said programmable device as circuitry that adjusts timing of said intermediate blocks after output from said first cipher path circuitry; and
instructions to configure logic of said programmable device as second cipher path circuitry that processes said intermediate blocks to implement a second portion of said one of decryption or encryption.

* * * * *